US012617342B1

(12) United States Patent
Park et al.

(10) Patent No.: US 12,617,342 B1
(45) Date of Patent: May 5, 2026

(54) MULTI CAMERA IMAGE DISPLAY

(71) Applicant: GM Global Technology Operations LLC, Detroit, MI (US)

(72) Inventors: Jonglee Park, Novi, MI (US); Julien P. Mourou, Bloomfield Hills, MI (US); Charles R. Quinn, Pleasant Ridge, MI (US); Manoj Kumar Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/971,659

(22) Filed: Dec. 6, 2024

(51) Int. Cl.
B60R 1/26 (2022.01)
B60R 1/12 (2006.01)

(52) U.S. Cl.
CPC .................. B60R 1/26 (2022.01); B60R 1/12 (2013.01); *B60R 2001/1253* (2013.01); *B60R 2300/303* (2013.01); *B60R 2300/304* (2013.01)

(58) Field of Classification Search
CPC ...... B60R 2001/1253; B60R 2300/303; B60R 2300/304; G06T 3/4046; G06T 3/02; G06T 5/16; G06T 20/00; G06V 1/87; G06V 10/56
See application file for complete search history.

(56) References Cited

U.S. PATENT DOCUMENTS

| | | | | | |
|---|---|---|---|---|---|
| 7,746,396 | B2 * | 6/2010 | Mikkonen | ............ | H04N 25/133 |
| | | | | | 348/278 |
| 7,786,898 | B2 * | 8/2010 | Stein | ....................... | G06V 20/58 |
| | | | | | 340/436 |

| | | | | | |
|---|---|---|---|---|---|
| 8,446,470 | B2 * | 5/2013 | Lu | ........................... | H04N 23/11 |
| | | | | | 348/148 |
| 10,787,116 | B2 * | 9/2020 | Schofield | ............... | H04N 25/76 |
| 11,035,690 | B2 * | 6/2021 | Cervelli | .................. | G06F 16/50 |
| 11,924,555 | B2 * | 3/2024 | Tang | ....................... | H04N 23/72 |
| 2005/0134697 | A1 * | 6/2005 | Mikkonen | .............. | H04N 23/11 |
| | | | | | 348/E9.01 |

(Continued)

OTHER PUBLICATIONS

Jung et al. "Fusionnet: Multispectral fusion of RGB and NIR images using two stage convolutional neural networks." IEEE Access 8 (2020): 23912-23919.

(Continued)

*Primary Examiner* — Brian P Yenke
(74) *Attorney, Agent, or Firm* — CANTOR COLBURN LLP

(57) ABSTRACT

A vehicle includes at least one exterior facing camera and a viewing screen in communication with a controller. The camera includes a red green blue (RGB) imaging sensor and a near infrared (NIR) imaging sensor. An ambient light sensor is disposed on the vehicle and detects a magnitude of ambient lighting in an exterior environment. The controller stores instructions for: Receiving a RGB image from the RGB imaging sensor at a time t, receiving a NIR image from the NIR imaging sensor at the time t, and receiving a lumens value of the ambient light at the time t. Preprocessing the RGB image into a processed RGB image using one of a plurality of preprocessing techniques dependent upon the lumens magnitude of the ambient lighting. Fusing the processed RGB image and the NIR image into a single viewing image using a neural network. Displaying the viewing image.

20 Claims, 3 Drawing Sheets

(56)                    References Cited

U.S. PATENT DOCUMENTS

| 2007/0145273 | A1* | 6/2007 | Chang | H04N 25/17 |
|---|---|---|---|---|
| | | | | 348/E9.003 |
| 2012/0307106 | A1* | 12/2012 | Spears | H04N 23/745 |
| | | | | 348/E9.051 |
| 2015/0009288 | A1* | 1/2015 | Wu | H04N 13/296 |
| | | | | 348/43 |
| 2017/0064221 | A1* | 3/2017 | Taylor | H04N 23/70 |
| 2018/0075308 | A1* | 3/2018 | Song | G08G 1/167 |
| 2018/0309919 | A1* | 10/2018 | Naing | H04N 23/73 |
| 2025/0317656 | A1* | 10/2025 | Sa | H04N 23/71 |

OTHER PUBLICATIONS

German Office Action for German Application No. 102025102100. 7; dated Sep. 26, 2025; 5 pages.
Limmer, Matthias; Lensch, Hendrik PA. Infrared colorization using deep convolutional neural networks. In: 2016 15th IEEE International Conference on Machine Learning and Applications (Icmla). IEEE, 2016. S. 61-68.

\* cited by examiner

MULTI CAMERA IMAGE DISPLAY

The subject disclosure relates to vehicles, and in particular to a system for generating a single image using multiple cameras in a vehicle.

Vehicles include viewing mirrors, such as rear facing side view mirrors, to provide vehicle operator's with a view that would otherwise be impossible or impractical to achieve from the position of the vehicle operator.

Some vehicles include cameras, such as those used in a vehicle vision system, that are adjacent to traditionally placed mirrors or in place of the traditionally placed mirrors. In such cases, the driver is provided with a view generated by the camera(s).

The cameras, however, are limited by lighting conditions. When the lighting is too bright, the image produced can be oversaturated. Similarly, when the lighting is too dark, the image produced can be undersaturated. When images are oversaturated or undersaturated, it can be difficult to distinguish between distinct elements present in the image. This, in turn, limits the usefulness of the images as mirror replacements or as mirror supplements.

It is desirable to provide a system that compensates for oversaturation and/or undersaturation and provides the user with a legible image generated by the camera(s) without requiring the user to manually adjust a saturation of the camera images.

SUMMARY

In one exemplary embodiment a vehicle includes at least one exterior facing camera in communication with a controller. The camera includes a red green blue (RGB) imaging sensor and a near infrared (NIR) imaging sensor. A viewing screen is in communication with the controller. An ambient light sensor is disposed on the vehicle and is configured to detect a magnitude of ambient lighting in an exterior environment. The ambient light sensor is in communication with the controller. The controller includes a processor and a memory. The memory stores instructions for causing the processor to perform the operations of: Receiving a RGB image from the RGB imaging sensor at a time t, receiving a NIR image from the NIR imaging sensor at the time t, and receiving a lumens value of the ambient light at the time t. Preprocessing the RGB image into a processed RGB image using one of a plurality of preprocessing techniques, where the preprocessing technique used is dependent upon the lumens magnitude of the ambient lighting. Fusing the processed RGB image and the NIR image into a single viewing image using a neural network. Displaying the viewing image on the viewing screen.

In addition to one or more of the features described herein the neural network is a convolutional neural network trained via a training data set including a first set of NIR images and RGB images captured at a low lighting condition, a second set of NIR images and RGB images captured at an optimum light condition, and a third set of NIR images and RGB images captured at a high light condition.

In addition to one or more of the features described herein the first set of NIR images and RGB images is captured at an ambient lighting condition below a first threshold, and wherein RGB images in the first set of NIR images and RGB images are processed using an enhancement function.

In addition to one or more of the features described herein the second set of NIR images and RGB images is captured at an ambient lighting condition above a first threshold and below a second threshold, and wherein RGB images in the second set of NIR images and RGB images are not processed.

In addition to one or more of the features described herein the third set of NIR images and RGB images is captured at an ambient lighting condition above a first threshold and above a second threshold, and wherein RGB images in the third set of NIR images and RGB images are processed using a tone mapping function.

In addition to one or more of the features described herein the training data set includes color features extracted from the RGB images in the first, second and third training data set and contrast features extracted from the NIR images in the first, second and third training data set.

In addition to one or more of the features described herein the color features are extracted via a first loss function according to:

$$L_{perceptual}(Y_2, Y) = \frac{1}{C \times H \times W} \|\phi(Y_2) - \phi(Y)\|_2^2$$

where L is the extracted features, $Y_2$ is a final fused image output, and Y is a ground truth image from the RGB imaging sensor, C is a set of color channels defining each image, H is a height of each image and W is a width of each image; and wherein the contrast features are extracted via a second loss function according to:

$$L_{nir}(Y_2, N) = \frac{1}{C \times H \times W} \|\phi(Y_2) - \phi(N)\|_2^2$$

where N is the original NIR image from the NIR imaging sensor.

In addition to one or more of the features described herein the first loss function and the second loss function are combined into a third loss function according to: $L = L_{perceptual}(Y_2, Y) + \lambda \ L_{nir}(Y_2, N)$ where, $0 < \lambda < 1$, $\lambda$ is a weighting parameter between 0 and 1 and wherein $\lambda$ is dependent on a lumens magnitude of the ambient light detected by the ambient light sensor.

In addition to one or more of the features described herein $\lambda$ has an elevated value at high and low lumens magnitudes.

In addition to one or more of the features described herein the controller further includes a mutual camera functionality test.

In addition to one or more of the features described herein the NIR imaging sensor and the RGB imaging sensor are disposed proximate each other.

In addition to one or more of the features described herein the viewing screen is proximate a side view mirror, and wherein the viewing image is a side view image.

In addition to one or more of the features described herein the NIR imaging sensor and the RGB imaging sensor define a field of view at a side of the vehicle, and wherein the viewing image is a side view mirror replacement image.

In another exemplary embodiment a method for providing a viewing image to a vehicle operator including receiving a RGB image from a RGB imaging sensor within a camera at a time t, receiving a NIR image from a NIR imaging sensor within the camera at the time t, and receiving a lumens value of the ambient light at the time t, preprocessing the RGB image into a processed RGB image using one of a plurality of preprocessing techniques, wherein the preprocessing technique used is dependent upon the lumens magnitude of the ambient lighting, fusing the processed RGB image and the NIR image into a single viewing image using a neural network, and displaying the viewing image on the viewing screen.

In addition to one or more of the features described herein the neural network is a convolutional neural network trained via a training data set including a first set of NIR images and RGB images captured at a low lighting condition, a second set of NIR images and RGB images captured at an optimum light condition, and a third set of NIR images and RGB images captured at a high light condition.

In addition to one or more of the features described herein the first set of NIR images and RGB images is captured at an ambient lighting condition below a first threshold, and wherein RGB images in the first set of NIR images and RGB images are processed using an enhancement function.

In addition to one or more of the features described herein the second set of NIR images and RGB images is captured at an ambient lighting condition above a first threshold and below a second threshold, and wherein RGB images in the second set of NIR images and RGB images are not processed.

In addition to one or more of the features described herein the training data set includes color features extracted from the RGB images in the first, second and third training data set and contrast features extracted from the NIR images in the first, second and third training data set.

In addition to one or more of the features described herein the viewing image is a side view mirror replacement image.

In addition to one or more of the features described herein the viewing image is a side view mirror supplement and the viewing screen is disposed proximate a side view mirror supplemented by the viewing image.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
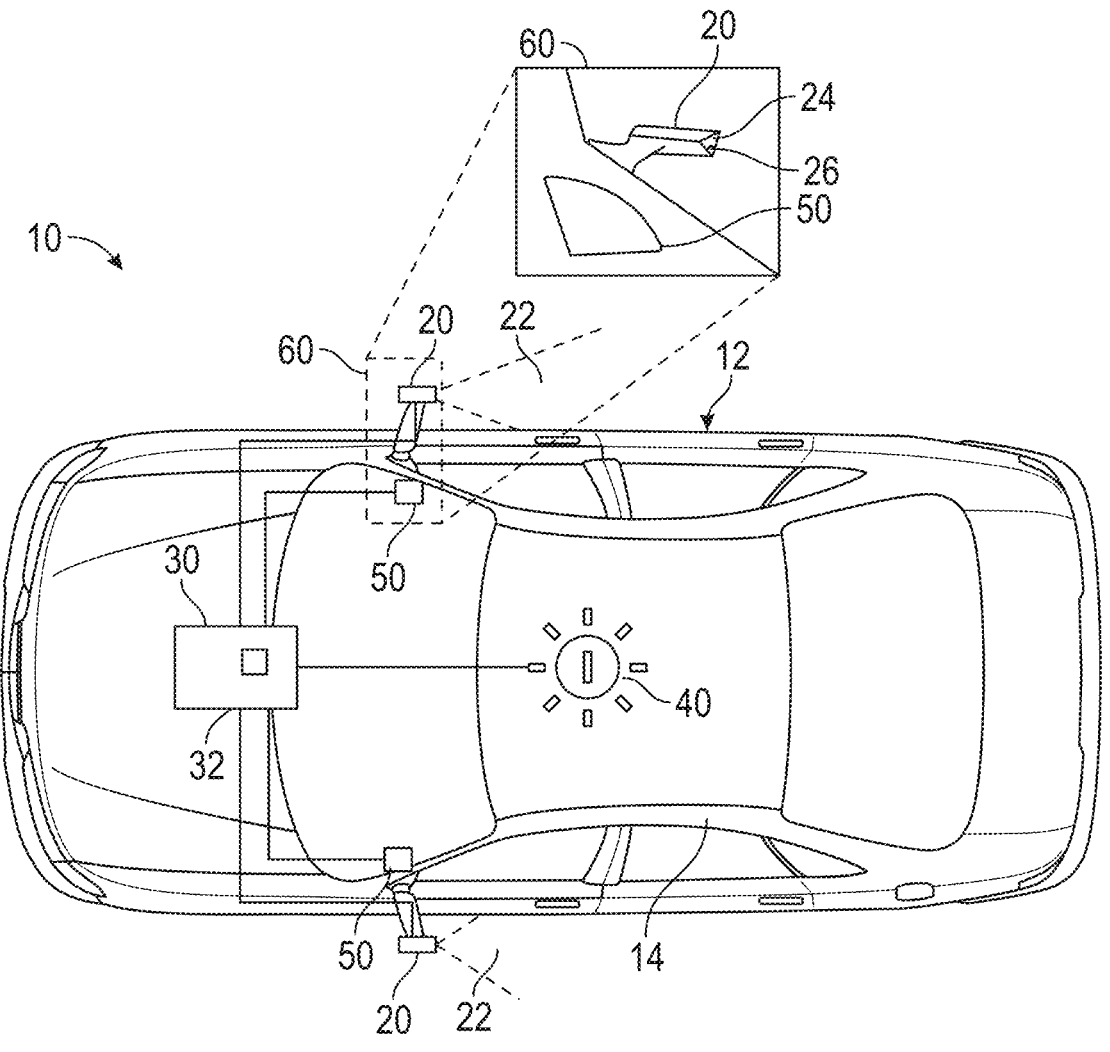
FIG. 1 is a vehicle including a vehicle vision system for generating camera mirror views.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term controller refers to a dedicated control system including a processor and a memory configured to implement a control scheme, a general control system including a processor and a memory with the memory storing instructions for causing the processor to implement the control scheme, a distributed set of processors and memories configured to operate in conjunction to implement a control scheme, or any similar configuration of elements configured to implement a control scheme.

In accordance with an exemplary embodiment, FIG. 1 illustrates a vehicle 10 including a body 12 and a passenger compartment 14. The vehicle 10 includes wing mounted cameras 20 defining rear facing fields of view 22. In the example of FIG. 1, the wing mounted cameras 20 are disposed at a traditional position on the vehicle body 12 of side view mirrors. In alternate examples, the cameras 20 may be mounted to the vehicle body 12 at any relevant location capable of providing a field of view desirable for a driver of the vehicle 10.

Each of the cameras 20 is connected to a vehicle vision system controller (controller 30). The cameras 20 include imaging sensors 24 for capturing red-green-blue (RGB) images and imaging sensors 26 for capturing near infrared (NIR) images. While undersaturated or oversaturated, the RGB images retain color features of the image but the edges of objects in the image are obscured. Due to the obscured edges, it can be difficult for a vehicle operator to distinguish features in the image. Similarly, while oversaturated or undersaturated, the NIR images retain edges of objects in the image. In some practical examples, the RGB imaging sensor 24 and the NIR imaging sensor 26 are positioned proximate each other and can be overlaid such that the images present the same scene by shifting one of the images a set amount along one or both axis. As the RGB imaging sensor 24 and the NIR imaging sensor 26 are mechanically fixed relative to each other, the offset may be determined during calibration according to any known technique and stored in the controller 30.

Connected to the controller 30 is one or more ambient light sensor(s) 40. The ambient light sensor 40 is disposed at a top portion of the vehicle 10 and is configured to detect a lumens level of the ambient lighting conditions (referred to generally as the ambient lighting) in which the vehicle 10 is operating. In alternate examples, the ambient light sensor 40 may be positioned at any other location on the vehicle body 12 that is exposed to the ambient lighting. In one example, the ambient light sensor 40 further senses a directionality of the ambient lighting. By way of example, the ambient light sensor may detect bright light forward of the vehicle 10 and darkness behind the vehicle 10.

Multiple viewing screens 50 are connected to the controller 30. Each viewing screen 50 is configured to display a video feed provided by the controller 30, with the video feed providing a real time display of the video feed captured by the corresponding camera 20. Each viewing screen 50 is oriented such that a vehicle operator positioned at a driver's seat can see the displayed video feed. Typically, the displayed video feed is that of the nearest rear view camera 20. However, in some examples the corresponding camera 20 may be positioned remote from the viewing screen 50. An isometric partial view of a region 60 illustrates the rear view camera 20 and a corresponding viewing screen 50 in one exemplary configuration.

During oversaturation (excess lighting) and undersaturation (insufficient lighting) the RGB imaging sensor 24 in the camera 20 may lack sensitivity to provide a complete image capable of being displayed to the user on the viewing screen 50. Furthermore, due to the nature of the NIR imaging sensor 26, no color is provided in the NIR image. To rectify this deficiency, the controller 30 includes a processing module 32 configured to combine the images from the RGB imaging sensor 24 and the images from the NIR imaging sensor 26 into a single coherent image regardless of the current ambient light conditions. The processing module 32 uses a machine learning (ML) system such as a convolutional neural network to learn weighting values of the images from each of the RGB imaging sensor 24 and the NIR imaging sensor 26, and applies the weighting values when making the combination. The weighting values used in a particular combination are dependent on the detected ambient conditions at that particular time.

Figure 2:
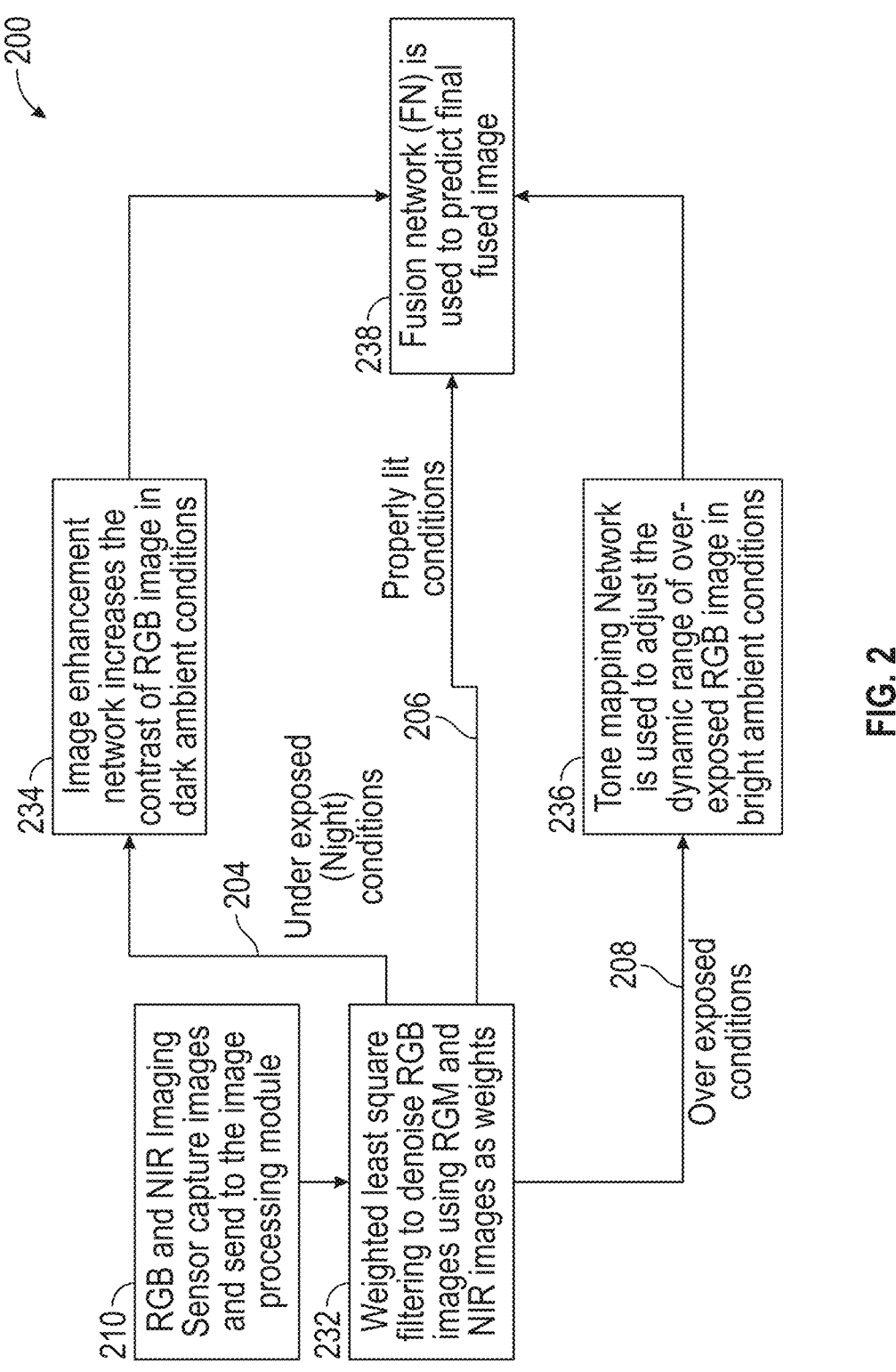
FIG. 2 is a preprocessing procedure for preparing images from multiple imaging sensors.

With continued reference to FIG. 1 FIG. 2 describes an image pre-processing procedure for preparing the images from the imaging sensors 24, 26 for fusion into a final viewing image for displaying on the viewing screens 50. Initially the imaging sensors 24, 26 capture images and provide the images to the controller 30 where the images are pre-processed in an image capture step 210.

The images from the image capture step 210 are provided to a denoising step 232. Within the denoising step 232, a weighted least square filtering is applied to the image from the RGB imaging sensor 24 to denoise the RGB image. The denoising step 232 uses the RGB images and the NIR images as training inputs, and the images are used to learn weights for projecting input image(s) to a desired output image. The denoising operates according to any established denoising process.

After the RGB image has been denoised, the pre-processing splits into three different processing pathways 204, 206, 208, with the particular pathway 204, 206, 208 being selected dependent on the lumens level of the ambient lighting detected by the ambient lighting sensor 40.

When the ambient lighting sensor 40 detects ambient lighting below a first threshold, the process 200 proceeds along a first pathway 204 corresponding to underexposed (night) conditions and increases the contrast of the image from the RGB imaging sensor 24 in an increase contrast step 234. After increasing the contrast of the image from the RGB imaging sensor 24, the first pathway 204 proceeds to a fusion network 238.

When the ambient lighting sensor 40 detects a lumens level of the ambient lighting between the first threshold and a second threshold, higher than the first threshold, the process 200 determines that no pre-processing of the image from, the RGB sensor 24 is necessary and proceeds directly to the fusion network 238 along a second neural network pathway 206.

When the ambient lighting sensor 40 detects a lumens level of the ambient lighting above the second threshold, indicating overexposed conditions, a tone mapping network is used to adjust a dynamic range of the overexposed image from the RGB imaging sensor 24 in a tone mapping step 236. After the tone mapping, the process 200 proceeds to the fusion network 238.

The particular values of the first and second threshold vary depending on the fidelity of the RGB imaging sensor 24 and the NIR imaging sensor 26 and can be determined empirically during a calibration process for any given assembly or design.

The fusion network 238 uses a convolutional neural network to extract one set of features from the RGB image and a second set of features from the NIR image. The fusion network 238 then combines the features into a single image, applying learned weights corresponding to the measured lumens level of the ambient lighting, and outputs the fused image to the corresponding viewing screen 50. By way of example, the features extracted from the RGB image can be color features, while the features extracted from the NIR image can be edge and contrast features.

Figure 3:
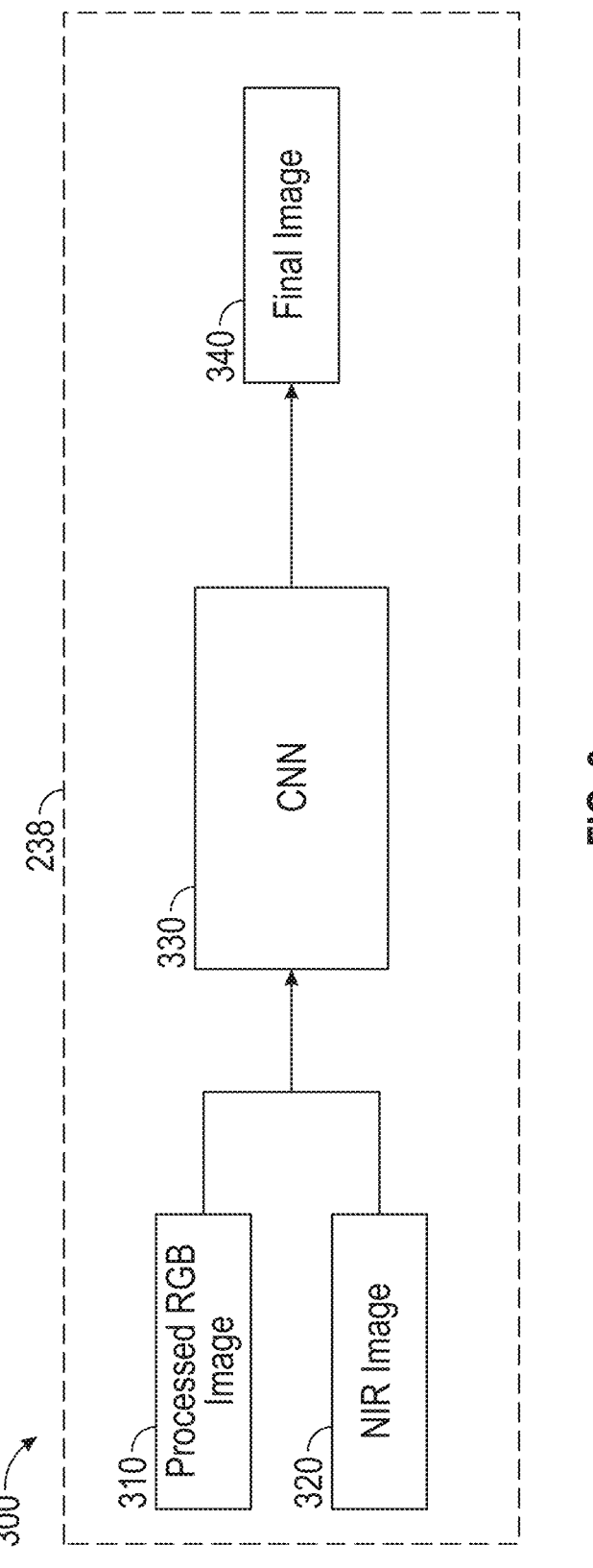
FIG. 3 is a process for combining the preprocessed images from FIG. 2 into a single image.

With continued reference to FIGS. 1 and 2, FIG. 3 illustrates an exemplary process 300 for combining the images from the RGB imaging sensor 24 and the NIR imaging sensor 26 of a single camera using a convolutional neural network 330 (i.e., operation of step 238 of FIG. 2).

A processed RGB image 310 from the RGB imaging sensor 24 and an NIR image 320 from the NIR imaging sensor 26 are provided to a convolutional neural network 330 which fuses the image into a single image output 340.

The convolutional neural network 330 is trained using training images generated under three distinct conditions: a low light condition, an optimal light condition, and a high light condition, with demarcations between the lighting conditions correlating to the first and second thresholds identified with regards to the preprocessing.

Under low light conditions, RGB images from the RGB imaging sensors 24 experience a loss of detail and color, while the NIR images from NIR imaging sensors 26 provide a high resolution and clear texture, but are devoid of color information. To train the convolutional neural network 30 for low light conditions The RGB images in the training set are denoised using a sub-network by according to:

$$Y_1 = E(X)$$

Where $Y_1$ is the denoised image, and X is the noisy RGB image, and E is any conventional enhancement function.

Under optimal light conditions the RGB images from RGB imaging sensors provide high levels of details, with the color information remaining intact and the NIR images from NIR imaging sensors provide high resolution, clear texture, but no color information.

The RGB images in the training set are denoised using a sub-network by according to:

$$Y_1 = (X)$$

Under high light conditions, the RGB images from RGB imaging sensors 24 lose detail and color information due to saturation, while the NIR images from the NIR imaging sensors 26 provide high resolution and clear texture with no color information. In the high light conditions, a tone mapping process is applied to the RGB images according to:

$$Y_1 = T(X)$$

Where T is any conventional tone mapping function, and the tone mapping function is applied to the image for dynamic range adjustment.

After the Images in the training data are enhanced, features are extracted from the RGB images in all three sets according to the following loss function:

$$L_{perceptual}(Y_2, Y) = \frac{1}{C \times H \times W} \|\phi(Y_2) - \phi(Y)\|_2^2$$

Where L is the extracted features, $Y_2$ is a final fused image output, and Y is a ground truth image from the RGB image sensor. C×H×W is the image size, with C representing the color channels, H representing the height and W representing the width of the image.

Similarly, features from NIR imaging sensor 26 are extracted using a loss function according to the following loss function:

$$L_{nir}(Y_2, N) = \frac{1}{C \times H \times W} \|\phi(Y_2) - \phi(N)\|_2^2$$

Where N is the original NIR image from the NIR imaging sensor 26.

The result is a combined loss function for training the convolutional network during all light conditions, with the combined loss function being:

$$L = L_{perceptual}(Y_2, Y) + \lambda L_{nir}(Y_2, N)$$

Where, $0 < \lambda < 1$ is a weighting parameter whose value changes depending on the ambient lighting conditions. $\lambda$ has a higher value in poorly lit conditions, providing the features extracted from the NIR image more weight in the low light conditions. Similarly $\lambda$ has a higher value in highly lit conditions and a lower value in standard lighting conditions.

The end result is a training data set include RGB images, NIR images, and extracted features at three different conditions. The convolutional neural network 330 is trained using the training data set, and the resultant trained convolutional neural network is used to combine the RGB images and the NIR images during operation of the vehicle 10.

In some implementations, one or more images used to generate the training data set may have regions with different lighting conditions. By way of example, a vehicle exiting a tunnel into a sunlit area will have a first region (the tunnel opening) with highly lit conditions and a second region (the tunnel walls and interior) with low lighting. Similar examples may include a tree line, city skyline, geographical feature (e.g., a hill or a mountain), or any similar feature shadowing a portion of the image. In such examples, the image is divided into regions corresponding to the lighting, and separate tone mapping processes are applied to each region of the image.

In some further implementations, the controller 30 may includes a mutual camera functionality test as part of the combination process. In one example, the mutual camera functionality test is performed by identifying a most prominent object in each of the image from the RGB imaging sensor 24 and the image from the NIR imaging sensor 26 using conventional object detection processes. The edges of the most prominent objects are compared, and if the edges of the most prominent objects match the RGB imaging sensor 24 and the NIR imaging sensor 26 are determined to be functioning. When one or both of the NIR imaging sensor 26 and the RGB imaging sensor 24 are in a failed state (e.g., an output from one or both of the imaging sensors is frozen), the edges of the most prominent objects will not match, and the controller 30 determines that at least one imaging sensor is not functioning properly.

Upon determining that one of the imaging sensors is not functioning properly, the controller 30 provides a warning to the vehicle operator indicating that there is an error in the camera functionality. In some examples, a dynamic image testing process can then be done to identify which imaging sensor is malfunctioning, and the images from the non-malfunctioning imaging sensor are used to generate the display on the corresponding viewing screen 50 without combining the images The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
at least one exterior facing camera in communication with a controller, wherein the exterior facing camera includes a red green blue (RGB) imaging sensor and a near infrared (NIR) imaging sensor;
a viewing screen in communication with the controller;
an ambient light sensor disposed on the vehicle and configured to detect a magnitude of ambient lighting in an exterior environment, the ambient light sensor being in communication with the controller;
the controller including a processor and a memory, the memory storing instructions for causing the processor to perform operations comprising:
receiving a RGB image from the RGB imaging sensor at a time t, receiving a NIR image from the NIR imaging sensor at the time t, and receiving a lumens value of ambient light at the time t;
preprocessing the RGB image into a processed RGB image using one of a plurality of preprocessing techniques, wherein the preprocessing technique used is dependent upon the magnitude of the lumens value of the ambient lighting;
fusing the processed RGB image and the NIR image into a single viewing image using a neural network; and
displaying a viewing image on the viewing screen.
2. The vehicle of claim 1, wherein the neural network is a convolutional neural network trained via a training data set including a first set of NIR images and RGB images captured at a low lighting condition, a second set of NIR images and RGB images captured at an intermediate light condition, and a third set of NIR images and RGB images captured at a high light condition.
3. The vehicle of claim 2, wherein the first set of NIR images and RGB images is captured at an ambient lighting condition below a first threshold, and wherein RGB images in the first set of NIR images and RGB images are processed using an enhancement function.

4. The vehicle of claim 2, wherein the second set of NIR images and RGB images is captured at an ambient lighting condition above a first threshold and below a second threshold, and wherein RGB images in the second set of NIR images and RGB images are not processed.

5. The vehicle of claim 2, wherein the third set of NIR images and RGB images is captured at an ambient lighting condition above a first threshold and above a second threshold, and wherein RGB images in the third set of NIR images and RGB images are processed using a tone mapping function.

6. The vehicle of claim 2, wherein the training data set includes color features extracted from the RGB images in the first, second and third training data set and contrast features extracted from the NIR images in the first, second and third training data set.

7. The vehicle of claim 6, wherein the color features are extracted via a first loss function according to:

$$L_{perceptual}(Y_2, Y) = \frac{1}{C \times H \times W}\|\phi(Y_2) - \phi(Y)\|_2^2$$

where L is the extracted features, $Y_2$ is a final fused image output, and Y is a ground truth image from the RGB imaging sensor, C is a set of color channels defining each image, H is a height of each image and W is a width of each image; and wherein the contrast features are extracted via a second loss function according to:

$$L_{nir}(Y_2, N) = \frac{1}{C \times H \times W}\|\phi(Y_2) - \phi(N)\|_2^2$$

where N is the original NIR image from the NIR imaging sensor.

8. The vehicle of claim 7, wherein the first loss function and the second loss function are combined into a third loss function according to:

$$L = L_{perceptual}(Y_2, Y) + \lambda L_{nir}(Y_2, N)$$

where, $0 < \lambda < 1\lambda$ is a weighting parameter between 0 and 1 and wherein $\lambda$ is dependent on a lumens magnitude of the ambient light detected by the ambient light sensor.

9. The vehicle of claim 8, wherein λ has an elevated value at high and low lumens magnitudes.

10. The vehicle of claim 1, wherein the controller further includes a mutual camera functionality test.

11. The vehicle of claim 1, wherein the NIR imaging sensor and the RGB imaging sensor are disposed proximate each other.

12. The vehicle of claim 1, wherein the viewing screen is proximate a side view mirror, and wherein the viewing image is a side view image.

13. The vehicle of claim 1, wherein the NIR imaging sensor and the RGB imaging sensor define a field of view at a side of the vehicle, and wherein the viewing image is a side view mirror replacement image.

14. A method for providing a viewing image to a vehicle operator comprising:

receiving a RGB image from a RGB imaging sensor within a camera at a time t, receiving a NIR image from a NIR imaging sensor within the camera at the time t, and receiving a lumens value of the ambient light at the time t;

preprocessing the RGB image into a processed RGB image using one of a plurality of preprocessing techniques, wherein the preprocessing technique used is dependent upon the lumens magnitude of the ambient lighting;

fusing the processed RGB image and the NIR image into a single viewing image using a neural network; and displaying the viewing image on the viewing screen.

15. The method of claim 14, wherein the neural network is a convolutional neural network trained via a training data set including a first set of NIR images and RGB images captured at a low lighting condition, a second set of NIR images and RGB images captured at an optimum light condition, and a third set of NIR images and RGB images captured at a high light condition.

16. The method of claim 15, wherein the first set of NIR images and RGB images is captured at an ambient lighting condition below a first threshold, and wherein RGB images in the first set of NIR images and RGB images are processed using an enhancement function.

17. The method of claim 15, wherein the second set of NIR images and RGB images is captured at an ambient lighting condition above a first threshold and below a second threshold, and wherein RGB images in the second set of NIR images and RGB images are not processed.

18. The method of claim 15, wherein the training data set includes color features extracted from the RGB images in the first, second and third training data set and contrast features extracted from the NIR images in the first, second and third training data set.

19. The method of claim 14, wherein the viewing image is a side view mirror replacement image.

20. The method of claim 14, wherein the viewing image is a side view mirror supplement and the viewing screen is disposed proximate a side view mirror supplemented by the viewing image.

\* \* \* \* \*